Patented Nov. 25, 1952

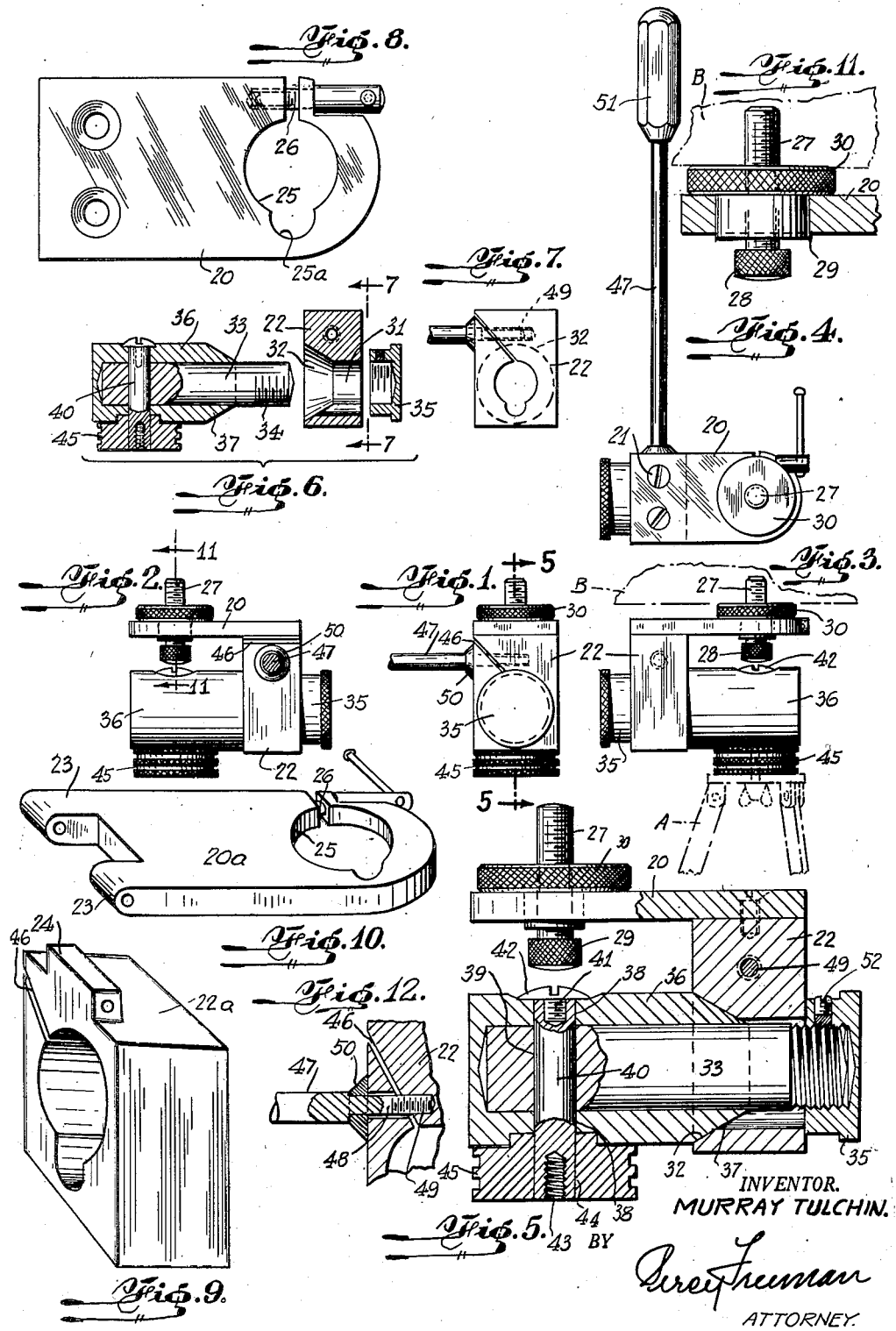

2,619,312

UNITED STATES PATENT OFFICE 2,619,312

PANORAMIC SUPPORT HEAD FOR CAMERAS

Murray Tulchin, Brooklyn, N. Y.

Application January 12, 1948, Serial No. 1,777

2 Claims. (Cl. 248—183)

This invention relates to new and useful improvements in adjustable supports for cameras, transits, telescopes, and the like, and has particular reference to a support of the type usually disposed between such instrument and a tripod. For the purpose of describing this invention, a camera will be referred to in the following paragraphs.

On devices of this general type heretofore known to the public, in order to adjust the camera in a vertical or a horizontal plane or with respect to both, there has generally been provided a plurality of adjustments and several handles, the manipulation of which was required for the separate adjustments and functions of the device. This required special effort and knowledge on the part of the operator and took quite a bit of time to make any desired adjustment. The device with such complicated parts and complexity of operation naturally was expensive far beyond any real need.

An object of the present invention is to meet a long-felt need and to provide a device in which the number of adjustable parts required to achieve a wide variety of positional adjustments of the camera is reduced to an absolute minimum.

A further object is to provide means by which play, which normally occurs in all frictional devices because of wear, can be taken up at will in a simple manner.

The cost of the device thus developed has, therefore, been reduced to a minimum and brings the article within the reach of everyone who wishes to mount a camera on a tripod and to be able to make adjustment of it thereon quickly and easily.

Further and more specific objects, features, and advantages will more clearly appear from the detailed specification hereinafter set forth especially when taken in connection with the accompanying drawing which illustrates a present preferred form which the invention may assume and which forms part of the specification.

In brief and general terms, the invention comprises elements adapted to rotate about two rectilinear axes and with a single manipulable means which by a continuous movement in one direction will clamp the elements with respect to movement about one or both of said axes dependent upon the degree of movement and will unclamp such elements by movement in the opposite directions.

More particularly, the invention includes two rectilinear shafts on one of which a camera-supporting element is mounted for rotation in one plane of movement, and a single means on said element for locking it to the shaft on which it is mounted, with additional means whereby continuation of the clamping action will also lock one shaft with respect to the other so that rotary movement in the other rectilinear direction is also prevented.

Still more particularly, the invention includes a single manipulable handle related to a split block or collar mounted on a rotatable cylinder for rotation in a vertical plane. Manipulation of the handle to a degree will bring into operation related conical surfaces to lock the block against rotation in said plane. Further rotation of the handle will cause the locking of said cylinder against rotation about the other plane.

Therefore, with this device, the operator can take the handle and move the camera at will in two planes for universal adjustment. When he wishes to lock it with respect to movement in the vertical plane, he rotates the handle to a small degree and this action shrinks the diameter of one related cone with regard to another, causing horizontal displacement and friction of a block between an adjustable cap and the other related cone. The camera is now locked against movement in the vertical plane. Further rotation of the handle will increase the above-mentioned displacement and exert pressure on a bolt, causing the shaft to be locked with the bolt and cylinder, thereby causing the camera to be locked against movement both in a vertical and horizontal plane.

The present preferred form which the invention may assume is illustrated in the drawings, of which:

Fig. 1 is an end elevation of the device.

Fig. 2 is an elevation taken from the left in Fig. 1.

Fig. 3 is an elevation taken from the right in Fig. 1.

Fig. 4 is a plan view of the device shown in Fig. 1.

Fig. 5 is an enlarged sectional view taken on the line 5—5 of Fig. 1.

Fig. 6 is an exploded view in section of the parts employed in clamping the bracket in determined positions.

Fig. 7 is a view taken on the line 7—7 of Fig. 6.

Fig. 8 is a plan view of the camera-supporting platform.

Fig. 9 is a perspective view of a modified form of the clamping block.

Fig. 10 is a perspective view of a modified form of a camera-supporting platform to be employed with the block shown in Fig. 9.

Fig. 11 is an enlarged view of the details of the camera mounting screw.

Fig. 12 is an enlarged section view of the details of the clamp screw of Fig. 7.

Now referring merely to the specific structure shown in the drawings, it will be seen that the device is adapted to be mounted on top of a tripod denoted by the letter A and shown in dotted lines, and to support a camera B, also shown in dotted lines (Fig. 3). The simple adjustment permits the camera to be locked against movement around a vertical axis and optionally around a horizontal axis, as desired, by the simple and rapid manipulation of a single element such as a handle.

The camera B is removably connected to a platform 20 which at one end may be secured by screws 21 (Fig. 4) to split block 22 (Fig. 7) and to move therewith. The platform 20a, shown in Fig. 10, is a modified form thereof, in which it is pivotally, instead of fixedly, connected to the block 22a.

In this form, the platform 20a has spaced end lugs 23 between which is disposed an elongated boss 24 on the top of block 22a (Fig. 9), and these elements are united by a pintle (not shown) when aligned. Thus, in this form of platform 20a, there may be provided any well-known leveling device between the platform 20a and the adjacent top of the block 22a, so that a camera B, supported on the platform 20a may be adjusted to a level position.

The camera may be connected to the platform 20 or 20a in many ways, but one preferred form is shown in detail in Figs. 8 and 10. The platform 20 in either form is provided with a split end and a receiving aperture 25 which communicates with recess 25a provided to further weaken the metal of platform 20 to impart elasticity to the clamping end of the plate, as will be understood. The split end is loosened or tightened by an adjusting threaded shaft 26 in a conventional manner.

To connect the camera to the platform, there is provided a screw 27 (Fig. 11), which is adapted to be projected into a suitable hole in the bottom of the camera B. This screw has a head 28 on the lower end. Threaded on the screw 27 is a lock nut 30 having an integral boss 29 which is adapted to fit freely into the aperture 25 (Fig. 8) and to be clamped therein when the split platform 20 is tightened on the boss 29.

With the camera firmly positioned on the platform 20 which is connected on the top of the block 22, it is now pertinent to describe the manner in which the block may be operated to swing the camera with the block in paths around both a vertical and a horizontal axis, and then to clamp the parts so that further movement in the directions may be prevented.

The block 22 (Fig. 6) is provided with a through horizontal passage which, adjacent one face of the block, is cylindrical as at 31, and adjacent the other face, is conical as at 32. A bolt 33, threaded at one end 34, projects through the passage and extends beyond the right face of the block 22 to receive a screw cap 35. Slidably fitted on the bolt 33 is a hollow cylinder 36 open at one end and closed at the other. The wall of the cylinder rearward of the open end is conically tapered as at 37 to correspond to the tapered conical passage 32 above mentioned. When these parts are assembled with axis pin 40, as seen in Fig. 5, they are held together by screw cap 35 and kept in alignment by conical surfaces 32 and 37.

The cylinder 36 and the bolt 33 are provided with bores 38 and 39, respectively, which are adapted to be aligned to receive an axis pin 40, the upper end of which is interiorly threaded to receive a cap screw 41 (Fig. 5), the flange of which 42 rests on the top of the cylinder to hold the pin in axial position within the aligned bores mentioned. The lower end of the pin 40 has an interiorly threaded bore 43, and press-fitted over end 44 is flange 45. The interior bore 43 receives the stem of the usual screw which extends up from the top of the tripod A (not shown). Thus, the axis pin may be held firmly in position, and both the cylinder 36 and the bolt 33 may rotate around the pin unless otherwise restrained from doing so.

It is clear that the clamping block 22 can be rotated around the horizontal axis of the cylinder 36. This block is split as at 46 (Fig. 1), and a shaft 47 extends across this split 46 and is threaded at 48 to engage a threaded bore 49 on the other side of the split. The shaft is provided with a fixed flange 50 bearing against the outer surface of the block. As the shaft 47 is turned one way or the other, the block is loosened or tightened to produce relative movement between the block 22 and the sleeve 36 in a manner to be described. The shaft 47 is extended outward from the block to form a handle and has a hand grip 51 to enable the shaft to be rotated readily and to also act as a means whereby the unit can be moved to swing the camera around the horizontal axis of shaft 33 or around the vertical axis of pin 40, unless clamped to prevent one or both of these movements.

With the parts in the positions shown in Fig. 5, they are so physically dimensioned and related that the first small amount of tightening of the shaft 47 will shrink the diameter of the conical surface 32 in split block 22 to cause relative displacement between the block and conical surface 37 on cylinder 36 causing block 22 to lock between the conical surface 37 and the inner face of screw cap 35, and thus prevent any motion in a vertical plane of the block 22, and consequently the camera B around the horizontal axis of the cylinder 36. Further tightening movement of the shaft 47 will then cause the tapered portion 32 of the passage in the block 22 to further shrink upon the tapered end 37 of the cylinder 36. With the block 22 already clamped tightly between the conical surface 37 and inner surface of screw cap 35, it will be seen that the further tightening of the block through the two tapered surfaces will create a component of movement relatively between the bolt 33 and the cylinder 36 to the left. This will tend to create a very small disalignment of the bores in the bolt 33 and the cylinder 36 which will cause a jamming action on the axis pin 40, and thus prevent any movement of the sleeve and the bolt around said pin. Therefore, the second portion of the turning movement of the handle shaft 47 will then prevent the movement of the camera and the block 22 around the vertical axis of the pin 40.

Thus a slight turning of the handle will lock the camera support against movement of the camera in a vertical plane and further continued movement of the handle in the same direction will lock the camera support against movement of the camera around in a horizontal plane. Thus we have a single element which by its movement more or less in a single direction effects an optional single and/or double clamping action, and does away with the former necessity of having a plurality of handle to control two movements individually. Even while connected to the plate 20, the camera may be turned thereon in any angular position of the plate by loosening the locking shaft 26.

The device is extremely simple, rugged, and can be operated with accuracy and dispatch with one hand on the tripod and one on the control and clamping handle 51.

Should play develop because of wear between conical surfaces 32 and 37 (Fig. 5), pin 40 and surfaces 38 and 39 (Fig. 5), and between right hand surface of block 22 and left hand surface of adjusting screw cap 35, locking screw 52 may be loosened and screw cap 35 adjusted clockwise until all play disappears. Lock screw 52 is then tightened.

While the invention has been described in detail and with respect to a present preferred form which the invention may assume, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

Having thus described my invention, what I claim as new and desire to secure by Letters Patent, is:

1. In a device of the class described, a hollow cylinder, and a bolt having a part axially received within said cylinder, both bolt and cylinder having aligned transverse bores, an axis pin extending through said bores, means to connect said pin to a tripod, one end of the cylinder being cone-shaped, a block having a bore through which one end of the bolt extends, a corresponding end of the bore in the block having a tapered portion to receive and coact with the conical end of the cylinder, said block having a slit extending through one wall thereof and communicating with said bore, an adjustable screw cap threadedly engaged with the extending end of the bolt, with a face of the cap abutting a face of the block, a rotatable handle screw-threadedly engaged with a portion of said block on one side of said slit, and freely rotatable in the portion of said block on the other side of said slit, a shoulder on said handle rotatably bearing against the outer surface of said wall on said other side of said slit, said handle being adapted upon initial turning to tighten the block on the cylinder and upon further turning of the handle to cause relative displacement between the tapered surfaces of the block and the cylinder and hence relative axial movement between the cylinder and the enclosed bolt whereby they tighten on the axis pin to prevent rotation of the cylinder and bolt around the axis pin.

2. A device as called for in claim 1 further characterized by the inclusion of means to adjust all the relatively movable parts to take up play caused by wear.

MURRAY TULCHIN.

REFERENCES CITED

The following references are of record in the file of this patent:

UNITED STATES PATENTS

| Number | Name | Date |
| --- | --- | --- |
| D. 152,247 | Flesh | Jan. 4, 1949 |
| 1,883,997 | Lessler | Oct. 25, 1932 |
| 1,919,554 | Howell | July 25, 1933 |
| 2,143,606 | Mooney | Jan. 10, 1939 |
| 2,166,258 | Matrat | July 18, 1939 |
| 2,226,827 | Moore | Dec. 31, 1940 |
| 2,261,426 | Willcox | Nov. 4, 1941 |
| 2,424,499 | Pasturczak | July 22, 1947 |
| 2,434,829 | Bentzman | Jan. 20, 1948 |
| 2,469,063 | Bliss | May 3, 1949 |
| 2,499,066 | Jacobson | Feb. 28, 1950 |